(12) United States Patent  
Pittaway et al.

(10) Patent No.: US 8,973,026 B2  
(45) Date of Patent: Mar. 3, 2015

(54) DECODING MEDIA CONTENT AT A WIRELESS RECEIVER

(75) Inventors: Richard E Pittaway, Ipswich (GB); Antony W Rix, Melbourn (GB); Philip Michaelson-Yeates, Melbourn (GB)

(73) Assignee: British Telecommunications Public Limited Company, London (GB)

( * ) Notice: Subject to any disclaimer, the term of this patent is extended or adjusted under 35 U.S.C. 154(b) by 1046 days.

(21) Appl. No.: 12/373,382

(22) PCT Filed: Jun. 26, 2007

(86) PCT No.: PCT/GB2007/002382  
§ 371 (c)(1),  
(2), (4) Date: Jan. 12, 2009

(87) PCT Pub. No.: WO2008/007045  
PCT Pub. Date: Jan. 17, 2008

(65) Prior Publication Data  
US 2009/0304115 A1  Dec. 10, 2009

(30) Foreign Application Priority Data

Jul. 13, 2006  (GB) .................................. 0613944.8

(51) Int. Cl.  
*H04N 7/18* (2006.01)  
*H04N 7/173* (2011.01)  
(Continued)

(52) U.S. Cl.  
CPC .............. *H04N 21/835* (2013.01); *H04H 60/14* (2013.01); *H04N 7/17318* (2013.01); *H04N 21/2541* (2013.01); *H04N 21/41407* (2013.01); *H04N 21/4627* (2013.01); *H04N 21/47202* (2013.01); *H04N 21/6112* (2013.01); *H04N 21/6181* (2013.01); *H04N 21/63775* (2013.01);  
(Continued)

(58) Field of Classification Search  
CPC combination set(s) only.  
See application file for complete search history.

(56) References Cited

U.S. PATENT DOCUMENTS 6,385,596 B1  5/2002  Wiser et al.  
2002/0178279 A1*  11/2002  Janik et al. .................... 709/231  
(Continued)

FOREIGN PATENT DOCUMENTS

WO  99/16277  4/1999  
WO  99/33076  7/1999  
(Continued)

OTHER PUBLICATIONS

International Search Report for PCT/GB2007/002382, mailed Oct. 19, 2007.

(Continued)

*Primary Examiner* — Kieu Oanh T Bui  
(74) *Attorney, Agent, or Firm* — Nixon & Vanderhye P.C.

(57) ABSTRACT

A wireless receiver, in the form of a mobile telephone, includes a DAB receiver and a GSM/GPRS transceiver which enables bi-directional point-to-point data communications via a service provider. The DAB receiver is arranged to receive media data from an over-the-air broadcast channel, the media data primarily representing television and radio streams. In order that the streams can be decoded and decrypted by media playing software on the wireless receiver, a provisioning operation is employed to provide NSC header files and DRM licenses to users in response to them making content requests. The header files and licenses are sent over a separate data channel and in advance of the broadcast content.

26 Claims, 8 Drawing Sheets

(51) Int. Cl.
*H04N 21/835* (2011.01)
*H04H 60/14* (2008.01)
*H04N 21/254* (2011.01)
*H04N 21/414* (2011.01)
*H04N 21/4627* (2011.01)
*H04N 21/472* (2011.01)
*H04N 21/61* (2011.01)
*H04N 21/6377* (2011.01)
*H04N 21/8355* (2011.01)
*H04H 60/40* (2008.01)
*H04H 60/91* (2008.01)

(52) U.S. Cl.
CPC ............ *H04N21/8355* (2013.01); *H04H 60/40* (2013.01); *H04H 60/91* (2013.01)
USPC .................. 725/31; 725/81; 725/93; 725/98; 725/99

(56) References Cited

U.S. PATENT DOCUMENTS

| | | | |
|---|---|---|---|
| 2003/0078061 A1 | 4/2003 | Kim | |
| 2003/0100320 A1* | 5/2003 | Ranjan | 455/466 |
| 2004/0090466 A1* | 5/2004 | Loveria, III | 345/781 |
| 2004/0162846 A1 | 8/2004 | Nakahara et al. | |
| 2004/0248561 A1* | 12/2004 | Nykanen et al. | 455/414.2 |
| 2005/0090235 A1* | 4/2005 | Vermola et al. | 455/414.3 |
| 2006/0159117 A1 | 7/2006 | Furlong et al. | |
| 2007/0005795 A1* | 1/2007 | Gonzalez | 709/232 |

FOREIGN PATENT DOCUMENTS

| | | |
|---|---|---|
| WO | 99/52304 | 10/1999 |
| WO | 03/067888 A1 | 8/2003 |
| WO | 2004/057446 | 7/2004 |
| WO | 2004/066100 A3 | 8/2004 |

OTHER PUBLICATIONS

Cisco Systems: "Using the Microsoft Windows Media Server with Cisco Application and Content Networking System 5.1", Cisco White Paper, Dec. 31, 2003., XP002454043.

"Digital Audio Broadcasting (DAB)" ETSI Standards, European Telecommunications Standards Institute, Sophia-Antipo, FR, vol. BC, No. V131, Feb. 2006, XP014033908.

"Digital Audio Broadcasting (DAB)" ETSI Standards, European Telecommunications Standards Institute, Sophia-Antipo, FR, vol. BC, No. V111, Nov. 2000, XP014004879.

Qiong Liu, "Digital Rights Management for Content Distribution", Australian Computer Society, Dec. 31, 2003, pp. 1-10, XP002454044.

International Search Report and Written Opinion of the International Searching Authority mailed Oct. 19, 2007 in PCT/GB2007/002382.

UK Search Report dated Oct. 13, 2006 in GB0613944.8.

* cited by examiner

Fig. 2a

| | 1700 | 1900 | 2100 | 2300 |
|---|---|---|---|---|
| C1 | GLOBAL NEWS | | SPORTS NEWS | FINANCE REPORT | NO SERVICE |
| C2 | THE OFFICE | REGIONAL NEWS | POP IDOL | FILM: TITANIC |
| C3 | LIVE FOOTBALL: ENGLAND V. BRAZIL | | | SPORTS QUIZ |
| C4 | TALK RADIO | | UK CHART | NO SERVICE |

DECODING MEDIA CONTENT AT A WIRELESS RECEIVER

This application is the U.S. national phase of International Application No. PCT/GB2007/002382 filed 26 Jun. 2007 which designated the U.S. and claims priority to European Application No. 0613944.8, filed 13 Jul. 2006 the entire contents of each of which are hereby incorporated by reference.

FIELD OF THE INVENTION

This invention relates to methods and systems for receiving and delivering decoding information to enable the decoding of digital media content at a wireless receiver. The invention also relates to method and systems for receiving and delivering decryption information to enable the decryption of encrypted digital media content at a wireless receiver.

DESCRIPTION OF THE PRIOR ART

It is common for devices such as Personal Computers (PCs) and digital television set top boxes (STBs) to receive and output data representing media content, particularly video and/or audio content.

At the service provider end, the data will be encoded into a particular format such as AVI, MPEG, or WMV. At the receiver end, the media playing software will requires information as to how the data is encoded so that it can be correctly decoded. Where the receiving device may receive data encoded in a number of different formats, this decoding information is usually provided in the form of a header file which is delivered with the media content in response to a user request for the content over a one-to-one network connection. The header file will usually indicate the data format, the audio and video bit rates, and the display resolution of its associated content. In the case of Media Player so-called NetShowContainer (NSC) files provide the header information. When a user wishes to download a data stream for viewing or listening on Media Player, they initially establish a one-to-one link to the NSC file which itself provides the IP address of the media data as well as the header information for that media data.

Where a service provider also wishes to restrict access to media data, it may be encrypted so that only those users with a suitable decryption key can output the data. Such encryption represents a form of access management system by means of which providers control who can access and output their content, usually in return for a one-off payment or subscription. Digital Rights Management (DRM) and Conditional Access (CA) are known access methods. In CA, a master key is held on a user's smart card, e.g. inserted in the user's STB. Short messages are frequently transmitted with the media data stream to allow the smart card to generate the decryption key.

In the case of digital media data broadcast over-the-air to wireless receivers using a unidirectional broadcast link, there is a requirement to efficiently supply decoding and/or decryption information to selected receivers in response to user requests for specific services such as pay-per-view television or radio programmes or subscription channels comprising multiple programmes.

SUMMARY OF THE INVENTION

According to a first aspect of the invention, there is provided a method of receiving decoding information at a wireless receiver to enable the decoding of encoded media content received from an over-the-air broadcast channel, the method comprising: (a) at a time $t_a$, receiving a programme information file (PIF) comprising at least one link to a respective decoding file stored at a remote location, the or each decoding file being associated with media content to be transmitted in an over-the-air broadcast channel at a subsequent broadcast time $t_b$ and comprising information for software provided at the wireless receiver to decode the encoded media content; (b) activating said at least one link at the wireless receiver thereby to cause transmission of the associated decoding file from said remote location; and (c) storing said at least one received decoding file in memory on the wireless receiver.

In this way, a decoding file will be received by the wireless receiver in advance of the over-the-air broadcast content it is arranged to decode and so there is provided a way of decoding such broadcast content being transmitted at a later time. Step (a) may comprise receiving said decoding file from the remote location over a data link that is independent of the over-the-air broadcast channel. The data link may be a packet switched link.

The media content will generally be data representing audio and/or video content and which can comprise discrete radio and video programme files, e.g. representing individual programmes or groups of programmes, as well as streaming radio and video data representing individual channels. The term 'content' is not intended to be restricted to non-live (or archive) audio or video content and, as such, is also intended to cover data representing live or near-live audio or video information, e.g. a data feed representing a live sports event. In the preferred embodiment, media content is data encoded in WMV format but a number of different data formats can be used.

A decoding file may comprise a file containing the information necessary for media playing software to decode and output the media content. In this sense, the term decoding may be given a broad meaning and may cover both 'header file' decoding and also decryption type decoding.

The received PIF may comprise a hyperlink to the remote location, activation of said hyperlink being operable to establish an internet protocol (IP) session between the wireless receiver and the remote location thereby to enable transmission of the decoding file. The activating step (d) is preferably performed automatically at the wireless receiver without human-intervention. A check can be performed between steps (c) and (d) to determine if there is sufficient memory available on the wireless receiver to store the decoding file, step (d) being performed only if sufficient memory is available. The received PIF may comprise a plurality of hyperlinks to respective remote locations at which respective decoding files are stored, each decoding file being associated with different media content.

Step (c) can comprise receiving the PIF over a wireless data link, such as from a cellular communications network, as a WAP Push message or from a GPRS data channel.

The method may further comprise, prior to step (c), sending a PIF request from the wireless receiver to a remote location, the PIF request being sent over a wireless data link and identifying the wireless receiver such that the PIF sent back in step (c) is particular to said wireless receiver.

As mentioned above, the decoding file may be a programme header file comprising information at least identifying the encoding format of the encoded media content thereby to enable decoding and output by the software at the wireless receiver. The decoding file may be a license file from which can be derived a key suitable for decoding the associated media content thereby to enable decoding and output by the software of the wireless receiver.

There may also be provided a method of receiving media content transmitted in an over-the-air broadcast signal, the method being performed at a wireless receiver having media playing software stored thereon, the method comprising: at a time $t_p$, receiving and storing a decoding file in accordance with the above method; at a subsequent time $t_b$, receiving encoded media content from an over-the-air broadcast signal; decoding the encoded media content using information in the received decoding file; and outputting the decoded media content using the media playing software.

The encoded media content can be received in response to user-selection of said content from a plurality of media content streams receivable from one or more over-the-air broadcast signals. A plurality of decoding files associated with respective content streams may be stored at the wireless receiver, and wherein the decoding step further comprises identifying a decoding file associated with the received encoded content stream. The encoded stream and stored decoding files may be assigned respective identifiers, said identification step comprising correlating the identifier of the encoded stream with the identifier of its associated decoding file.

The encoded media content can be extracted from a DAB multiplex/ensemble.

According to a second aspect of the invention, there is provided a method of receiving decryption information at a wireless receiver to enable the decoding of encrypted media content received from an over-the-air broadcast channel, the method comprising: (a) at a time $t_d$, receiving a programme information file (PIF) comprising at least one link to a respective decryption file stored at a remote location, the or each decryption file being associated with media content to be transmitted in an over-the-air broadcast channel at a subsequent broadcast time $t_b$ and comprising information for software provided at the wireless receiver to decrypt the encrypted media content; (b) activating said at least one link at the wireless receiver thereby to cause transmission of the associated decryption file from said remote location; and (c) storing said at least one received decryption file in memory on the wireless receiver.

According to a third aspect of the invention, there is provided a method of receiving and outputting an encrypted media stream at a wireless receiver, the encrypted stream being transmitted in an over-the-air broadcast signal, wherein the method comprises: (a) receiving and storing one or more decryption files from a remote source, the or each decryption file being associated with a respective stream to be broadcast at a future broadcast time; (b) at a time subsequent to step (a), selecting one of a plurality of streams receivable from the over-the-air broadcast signal; (c) identifying a stored decryption file associated with the selected stream; and (d) deriving a key from the identified decryption file thereby to enable decryption of the selected stream for output at the receiver.

According to a fourth aspect of the invention, there is provided a method for delivering decoding information to a wireless receiver to enable the decoding of encoded media content transmitted in an over-the-air broadcast signal, the method comprising: (a) transmitting a programme information file (PIF) comprising at least one link to a respective decoding file to the wireless receiver, the or each decoding file being associated with media content to be transmitted in an over-the-air broadcast channel at a subsequent broadcast time $t_b$ and comprising information for software provided at the wireless receiver to decode the encoded media content; (b) in response to activation of one or more links in the PIF, sending the associated decoding file to the wireless receiver at a time $t_d$ which is prior to said broadcast time $t_b$.

According to a fifth aspect of the invention, there is provided a method for delivering a decryption key to a wireless receiver thereby to enable decryption, at said wireless receiver, of encrypted media content transmitted in an over-the-air broadcast signal, the method comprising: (a) transmitting a programme information file (PIF) comprising at least one link to a respective decryption file to the wireless receiver, the or each decryption file being associated with encrypted media content to be transmitted in an over-the-air broadcast channel at a subsequent broadcast time $t_b$ and comprising information for software provided at the wireless receiver to decrypt the encrypted media content; (b) in response to activation of one or more links in the PIF, sending the associated decryption file to the wireless receiver at a time $t_d$ which is prior to said broadcast time $t_b$.

According to a sixth aspect of the invention, there is provided a method for receiving and decoding media content at a wireless receiver, the method being performed at the wireless receiver and comprising A method for receiving and decoding media content at a wireless receiver, the method being performed at the wireless receiver and comprising: (a) receiving a first message comprising a hyperlink to a first location, downloading a programme information file therefrom which includes a hyperlink to a second location, and activating said hyperlink to download and storing one or more decoding files from the second location using a non-broadcast data channel; (b) selecting a media content stream receivable from a unidirectional broadcast channel; (c) identifying a stored decoding file suitable for decoding the selected media content stream in (b); and (d) receiving and decoding the selected media content stream using the decoding file identified in step (c).

According to a seventh aspect of the invention, there is provided apparatus for receiving and outputting digital content receivable from an over-the-air broadcast signal, the apparatus comprising: a broadcast receiver for receiving digital media content from an over-the-air broadcast signal; a wireless transceiver for establishing a data channel with a remote server; a control system; and decoding means, wherein the wireless transceiver is arranged to receive a programme information file (PIF) comprising a link to a remote server storing one or more decoding files, automatically to activate the link to establish a data channel with said remote server, to receive one or more decoding files from said server, and to store the or each decoding file in storage means, wherein the control system is arranged, in response to receiving identification of selected media content, to identify a decoding file in said storage means that is associated with said selected media content, and wherein the decoding means is operable to receive said selected encoded media content from the broadcast receiver and to decode the media content using the identified decoding file.

Preferred features of the above aspects are defined in the dependent claims.

BRIEF DESCRIPTION OF THE DRAWINGS

The invention will now be described, by way of example, with reference to the accompanying drawings in which.

DETAILED DESCRIPTION OF THE PREFERRED EMBODIMENT

Figure 1:
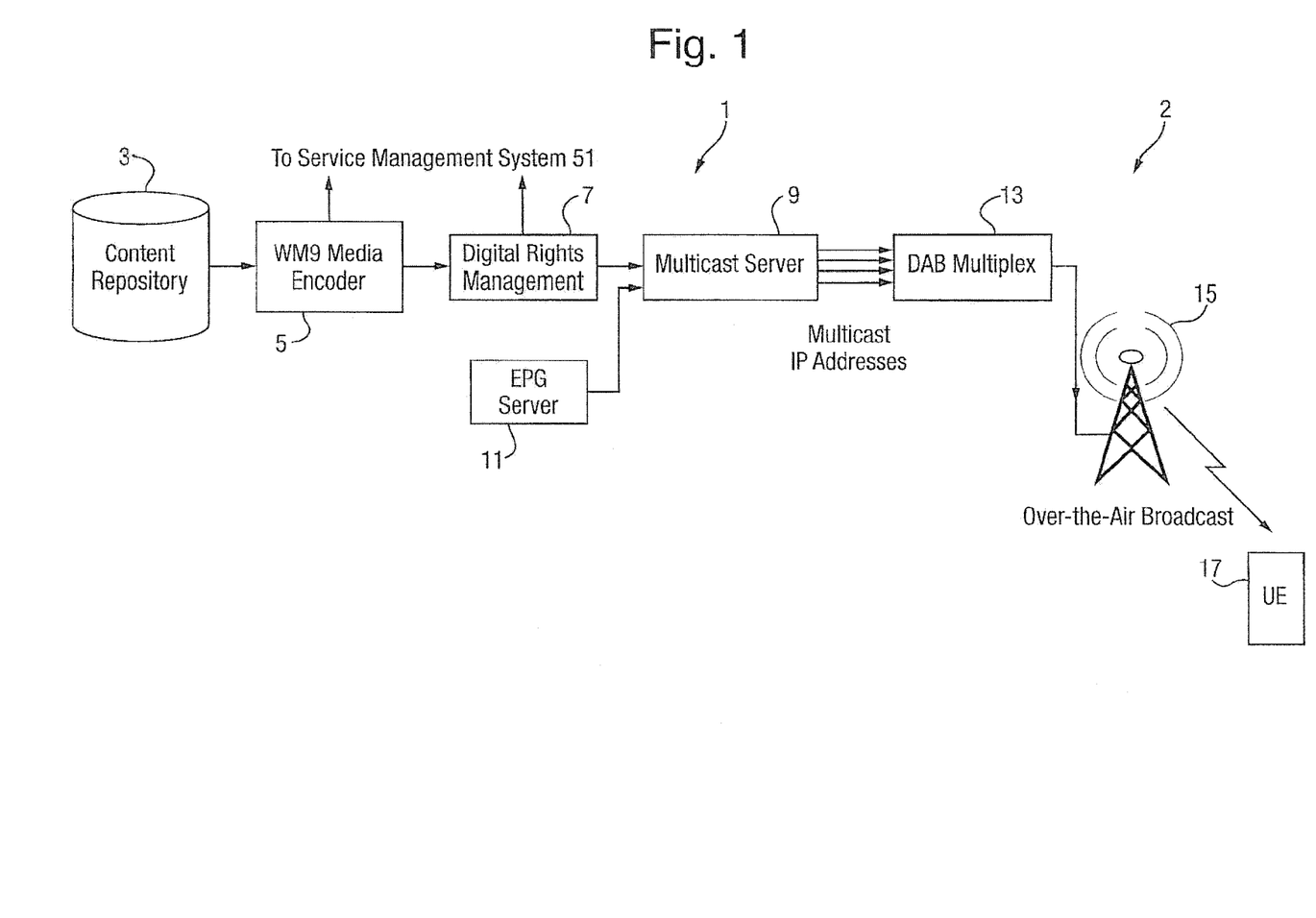
FIG. 1 is a block diagram showing components of a DAB broadcast system suitable for broadcasting media content, and a wireless receiver.

Referring to FIG. 1, respective systems for providing, broadcasting and receiving multimedia content, in this case video and/or audio content, using the known digital audio broadcast (DAB) system are shown.

At the broadcasting end, there is provided a head-end 1 and DAB transmitter 3. The head-end 1 comprises a content repository 3, a media encoder 5, a digital rights management (DRM) system 7, a multicast server 9 and an electronic programme guide (EPG) server 11. At the receiving end is a wireless handset 17 which includes a DAB receiver and means for outputting multimedia data received from over-the-air broadcast signals transmitted by the DAB transmitter. For ease of explanation, the handset will be referred to hereafter as user equipment (UE) 17.

In the head-end 1, the media content repository 3 stores, in digital form, video and/or audio content to be transmitted by the DAB transmitter 3. The repository 3 can also receive video and/or audio content from other sources, e.g. other content service providers. Such content may be live or near-live data feeds which may, for example, represent a live or near-live sports event. Whether provided in the form of discrete files or streamed media content, the repository holds details of digital media content that will be made available in a DAB broadcast for users operating UEs, such as the single UE 17 shown in FIG. 1.

The media content in the repository may already be encoded in any one of a number of digital formats, for example MP3, AVI, MPEG, H264, or WMV. The content is input to the media encoder 5 which converts the data into one or more video and/or audio formats appropriate for media playing software provided on the UE, that is a format that can be decoded and output by the media playing software having the necessary decoding and/or decryption information. In this case, the proprietary application Microsoft Media Encoder™ 9, hereafter simply 'Media Encoder', is used to convert the content into Windows Media Format (WMV). This application is chosen since the UE 17 uses Microsoft Windows Media Player™, hereafter simply 'MS Media Player', as its media playing application. For the encoded content, Media Encoder 9 also generates header files which provide Media Player with the decoding information necessary for it to understand how the WMV files are to be played. In particular, Media Encoder 9 generates header files known as NetShow-Container (NSC) files. Media Encoder 9 is also arranged to format the files or streams to suit the DAB broadcast bandwidth.

The WMF content is passed to the DRM system 7. As will be appreciated by those skilled in the art, DRM systems are computer-based systems used to enforce predefined policies for controlling access to digital data, such as software, music and video. As will be explained further below, the DRM system 7 operates in conjunction with a Service Management System to control the content to which different users have access. In simple terms, the DRM system 7 is arranged to encrypt WMF data using encryption keys, e.g. with different media programmes or channels being encrypted using different respective keys. In order to output content at the UE 17, it is necessary for the UE to have a corresponding decryption key. The way in which decryption keys are sent to handsets, such as the UE 17, will be described later on in the description.

Encrypted WMV content is sent to a multicast server 9 which also receives EPG data from the EPG server 11. The EPG data is used to populate an EPG wireframe at the UE 17 so as to indicate the name and broadcast times of content transmitted in the DAB broadcast. At Media Encoder 9, content is arranged into a number of separate channels, e.g. BBC1, SkyNews, and each channel contains a number of programmes. In DAB terminology it is common for channels to be referred to as 'services' and so this term will be used hereafter. The EPG data includes, for each programme, a service identity (ServiceID) to indicate the channel or service, the programme name, and at least its start time. Other data may be included, such as a brief description of programme.

The multicast server 9 converts the WMV content into packet data for streaming transmission to the DAB transmitter 2 using respective IP addresses. A stream may represent a discrete programme having a fixed duration, such as a pay-per-view sports event or news report, or, alternatively, the stream may represent a sequence of programmes The EPG data is also sent to the DAB transmitter 2. A suitable multicast server product is Microsoft Windows Media Streaming Server™.

Further information on the above-mentioned off-the-shelf Microsoft packages is available from http://www.microsoft.com/windows/windowsmedia/default.mspx. A detailed understanding of each is not necessary for understanding the present invention.

At the DAB transmitter 2, a DAB multiplex 13 receives each of the n multicast streams, e.g. four streams, from the respective IP addresses and broadcasts them in a DAB multiplex, or ensemble, from the transmitter aerial 15. The EPG data is also broadcast in the multiplex and is effectively treated as a separate service. The DAB multiplex 13 individually codes each stream in a channel coder by adding error protection and time interleaving. The services are then multiplexed in a so-called Main Service Channel (MSC) according to a predetermined multiplex configuration. The multiplexer output is combined with multiplex control and service information, including the ServiceIDs of each stream, and the information is placed in a so-called Fast Information Channel (FIC) to form the transmission multiplexer. Orthogonal Frequency Division Multiplexing (OFDM) is applied to shape the DAB signal. The signal is then transposed to the appropriate radio frequency band, is amplified and then transmitted over-the-air. Further information on DAB multiplexing and transmission can be viewed at http://www.worlddab.org/eureka.aspx. The number of channels/services that may be encoded in the MSC can vary in number and is generally only limited by its 2.3 Mbit/s capacity. The service provider may wish vary the number of channels to be broadcast depending on the time of day, e.g. by providing only two streams during the night and four during the day.

During broadcast, the DAB multiplex may be scanned by the UE 17, or indeed any number of UEs in range of the aerial 15, and individual services selectively received provided the necessary decoding and decryption information is present on the UE. At the UE, selected services are extracted from the DAB multiplex by means of correlating the ServiceID of the selected programme (e.g. from the EPG data) with ServiceIDs in the FIC. Based on this correlation, the multiplex control information for the identified Service ID is used to decode the COFDM-encoded service from the multiplex MSC. All that is then required is decoding by Media Player and, if necessary, decryption using the appropriate decryption key.

Figure 2A:
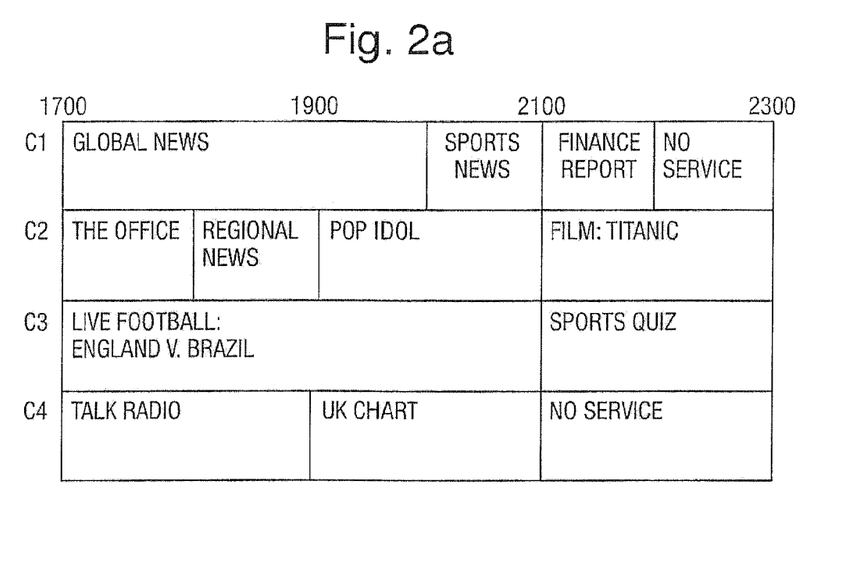
FIG. 2a is a graphical representation of an electronic programme guide (EPG) stored in an EPG server.
Figure 2B:
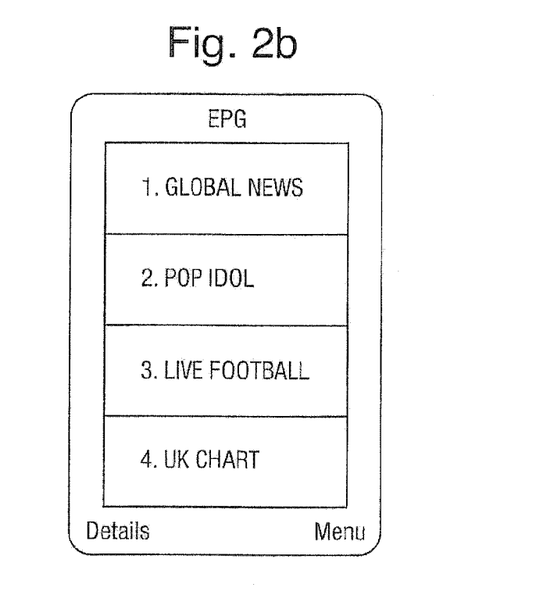
FIG. 2b is a graphical representation of an EPG when displayed on a display screen of the wireless receiver.

Referring to FIG. 2*a*, an example set of EPG data, stored in the EPG server 9, is shown for each of the four above-mentioned streams (C1, C2, C3 and C4) for the time period 1700 hrs to 2300 hrs. C1 carries video programmes relating primarily to news and current affairs, C2 carries entertainment-type video programmes, C3 carries video programmes of sporting events and sports-related entertainment and C4 is an audio channel carrying radio programmes. Not shown in FIG. 2 is the ServiceID for each stream since this sits in the background. FIG. 2*b* shows the EPG data when viewed on the UE at 1930 hrs.

Figure 3A:
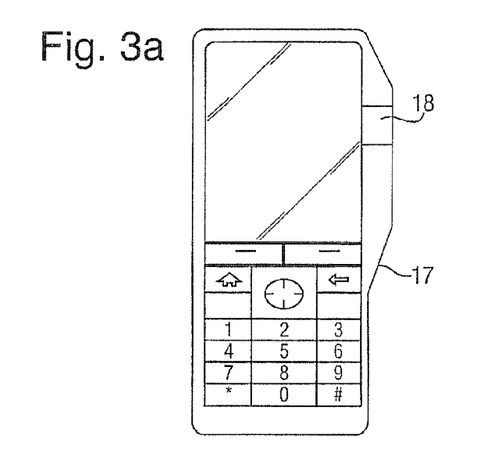
FIG. 3a is a front view of a wireless receiver provided in the form of a wireless telephone.
Figure 3B:
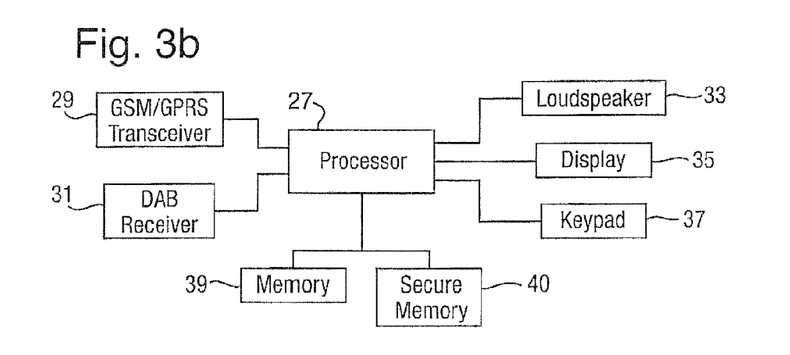
FIG. 3b is a block diagram showing the main functional components of the wireless receiver.

Referring to FIG. 3*a*, the UE 17 is shown in further detail. The UE 17 comprises a GSM wireless telephone having a display screen and keypad. A so-called tv/interaction button 18 is provided on the right-hand side of the telephone casing. Referring to FIG. 3*b*, the main functional components of the UE 17 comprise a microprocessor 27 to which is connected a GSM/GPRS transceiver 29, a DAB receiver 31, a loudspeaker 33, a display 35, a keypad 37, a general memory 39 and a secure license memory 40. The UE 17 is capable of conventional tri-band GSM (GSM 900, 1800 and 1900) and GPRS operation for voice and data communications. The DAB receiver 31 provides the UE 17 with the capability of receiving, amongst other channels, the four services (C1, C2, C3, C4) encoded in the multiplex that is broadcast from the transmitter aerial 15. Associated with the DAB receiver 31 is software for COFDM decoding. The UE 17 includes an antenna capable of receiving DAB signals in L-band and band III. Therefore, in addition to its function as a GSM telephone, the UE 17 is capable of receiving, decoding and displaying streaming multimedia content transmitted in over-the-air DAB signals.

The GSM/GPRS transceiver 29 enables bi-directional point-to-point data communications via a service provider (SP) network 19. As will be appreciated by those skilled in the art, GPRS is a mobile data service available to users of GSM mobile telephones, assuming their SP provides GPRS capabilities. GPRS is considered an 'always on' type data link since no dial-up connection is usually required—the link exists from the time the user switches their telephone on until the time the telephone is switched off. Compared with alternative mobile data communications methods, such as WAP, GPRS is favourable in terms of the speeds at which it can operate and provides convenient Internet access. To provide GPRS capabilities, the SP provides a controller at each base station to identify users within the relevant cell and to determine whether they have subscribed to that SP's GPRS service. Packet data switching nodes and gateways are also installed at the basestation to provide access to data networks, such as the Internet 21.

Figure 3C:
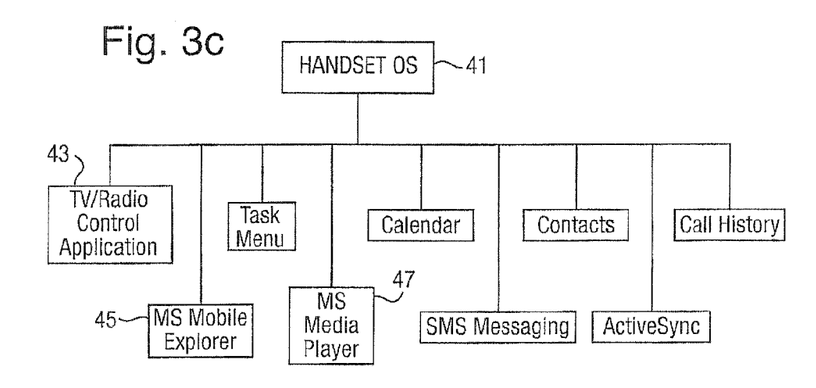
FIG. 3c is a schematic diagram indicating a plurality of software applications stored in memory on the wireless receiver.
Figure 3D:
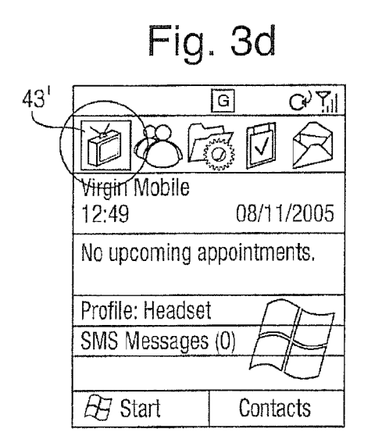
FIGS. 3d and 3e are screen shots of menu pages displayable by an operating system of the wireless receiver.
Figure 3E:
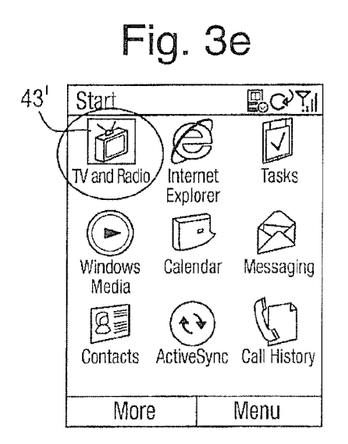

The general memory 39 serves to buffer video/audio data as it is COFDM decoded from the DAB receiver 31. The memory 39 also stores a number of software applications which, when executed under the control of the processor 27, provide different services on the UE 17. Referring to FIG. 3*c*, a top-level application is provided in the form of a handset operating system (OS) 41. The OS 41 provides a graphical user interface (GUI) that is output to the display screen 35 when the user first switches the UE 17 on. As well as providing conventional GSM voice call/reception functionality, the OS GUI provides a menu through which a user can view and run other applications. An example of a handset OS is MS Windows Mobile™ 2005. As FIG. 3*c* shows, these further applications include a TV/Radio Application 43, MS Mobile Explorer™ 45 and MS Media Player™ 47, although in the case of the latter, any player that can decrypt and display streaming data can be used. FIGS. 3*d* and 3*e* show example screen shots taken from the OS 41 to indicate how applications can be run from the OS GUI. FIG. 3*d* represents a homepage which is presented on the display screen 35 when the UI 17 is switched on. At the top part of the screen is presented a number of shortcut icons representing pre-selected ones of the available applications. To execute a particular application, the user uses the keypad 37 to move a curser to the appropriate icon whereafter a selection command is made. In this case, the TV/Radio Application 43 (represented here by a television icon 43') is highlighted. FIG. 3*e* indicates a so-called start sub-menu screen presented by the OS 41 which shows the full range of available applications. Again, selection is made by moving a cursor using the keypad and pressing a selection button.

The above-described menu selection steps have drawbacks in that the user is required to navigate using the keypad 37, usually by means of a cursor control or joypad, which can be small and awkward to use. Selection usually requires a number of inputs, such as directional controls and the selection command. Depending on how the menu system is set up, it may be necessary to go through a number of menu levels to access the desired application. To provide improved operation, the OS 41 enables one-click selection of a particular application by means of the tv/interaction button 18. At the software level, this is achieved by assigning one of the available applications to said tv/interaction button 18 and saving the assignment to memory 39. Thereafter, one-click actuation of the tv/interaction button 18 in any menu level of the OS 41 causes the assigned application to be executed on the UI 17.

In the present embodiment, the TV/Radio Application 43 is assigned to the tv/interaction button 18. Pressing said button 18 in any menu of the OS 41, or even during execution of any other application (other than the TV/Radio Application 43 itself) causes the TV/Radio Application to be executed by the UE processor 27. Actuating the tv/interaction button whilst running the TV/Radio Application 43 causes an interactive service to operate within said application.

TV/Radio Application 43 Overview

Figure 4:
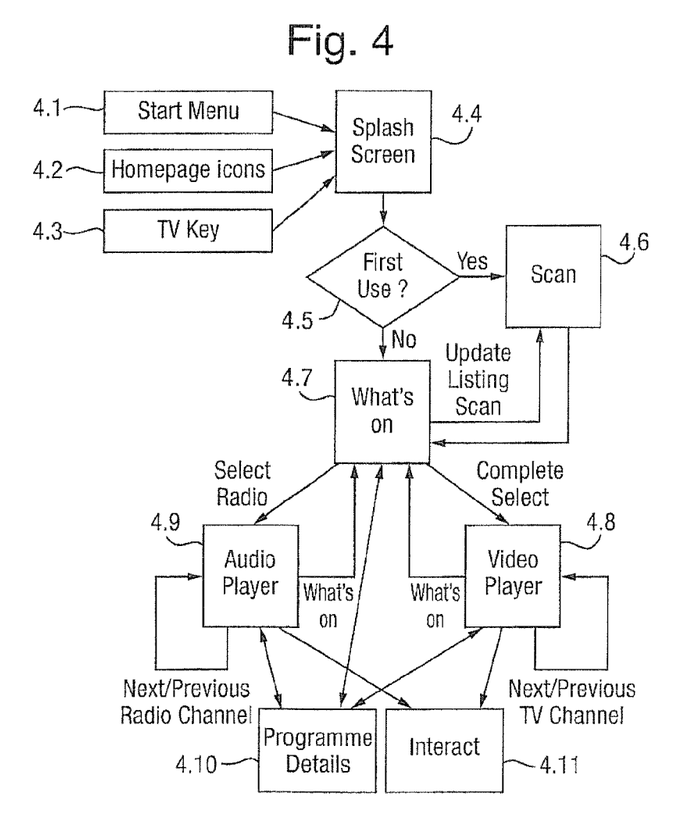
FIG. 4 is a flow chart showing navigating steps provided by a TV/Radio application of the wireless receiver.

The operation of the TV/Radio Application 43 will now be explained in further detail with reference to FIG. 4 which shows the basic navigation tree of the application. As indicated by reference numerals 4.1 to 4.3, the TV/Radio Application 43 can be executed by one of three methods, namely by keypad navigation to the start menu (FIG. 3*e*) or homepage menu (FIG. 3*d*) or by single-click actuation of the tv/interaction button 18. In step 4.4 the user is initially presented with a 'splash screen' which is a pre-stored image in the UE memory 39 which has two main purposes. First, the splash screen acts as a holding screen which is displayed whilst any obsolete data is removed from the memory 39. The time the image is displayed will depend on the amount of processing necessary to clear the obsolete data. Secondly, the splash screen provides brand, version and copyright information. In step 4.5 it is determined whether the application 43 is being run for the first time, in which case a scan of available services is performed in step 4.6. Following this, or if it is not the first time of operation, EPG data is displayed in step 4.7. Thereafter, the user may select a channel by moving a cursor to the desired audio or video programme and pressing a select key (steps 4.8 and 4.9). If the selected channel is a free-to-air channel requiring no decryption, the control application will decode the appropriate stream from the DAB broadcast for output on Media Player 47. If the selected channel is a channel requiring decryption, the application 43 will check that a suitable licence is stored in the license memory 40 of the UE before extracting the decryption key from the licence and decrypting the selected DAB signal for display on Media Player 47 together with programme details, if available (step 4.10). This is ordinarily acquired during a licence provisioning operation as will be described later on in the specification. If no such license is stored in the license memory 40, the control application will prompt the user with the option to acquire a license or licenses. This may involve the user making a one-off payment, e.g. for a pay-per-view event or a short term subscription, or a recurring payment for a longer-term subscription. Any number of business/payment models can be used by service providers. If the user proceeds with payment, the appropriate license or licenses are sent to the handset for storage on the secure license memory 40 whereafter a DRM component of Media Player 47 may extract the decryption key or keys from the license or licenses to enable subsequent decryption of content in the DAB broadcast.

Decoding

The method by which received DAB services are decoded by the UE 17 will now be briefly described. Decoding in this case refers not to OFDM decoding by the DAB receiver but to decoding WMV streams by Media Player using header files.

As background, the usual way of accessing and decoding streaming data from a remote content provider is by means of a one-to-one Internet Protocol (IP) link between the provider's streaming server and a receiver, usually a PC. The user operating the PC is able to browse and select streams and, because the user has a bi-directional IP connection to the source server, its media playing software has direct access to a 'header file' particular to the selected stream. The header file supplies information necessary for the media playing software, e.g. Media Player, to decode the streaming data. These particulars may include, for example, whether the stream represents audio or video data, the format in which the stream is encoded, the data rate at which the stream is to be played, and the display resolution of the programme.

As mentioned previously, Media Player requires access to a header file commonly known as a NSC file. A NSC file contains, amongst other information, a format block defining the format of the data, WMV in this case, as well as the display resolution (in the case of video) and the bit rates at which video and/or audio data should be played by Media Player. As will be described later, where content is encrypted, the NSC file for that content can be used to index the license stored in the secure license memory.

In the present system, content is broadcast from the transmitter 15 in an over-the-air unidirectional broadcast channel. Accordingly, there is no one-to-one link between the multicast server 9 and the Media Player software on the UE. It is therefore necessary to provide individual UEs with the header file(s) necessary to allow decoding of particular content in advance of the broadcast time of said content. In practice, it is convenient to provide a batch of header files corresponding to respective services or programmes in a single provisioning step. Accordingly, there must also be some mechanism at the UE 17 by which stored header files can be matched to their corresponding services. This matching will be briefly described below with the provisioning step being described later on in greater detail.

As mentioned previously, in the FIC of the DAB multiplex each service in the MSC is identified by a unique service ID. ServiceID's are regulated and assigned by the World Forum for DAB. A list of ID assignments for individual countries can be obtained via http://www.wohnort.demon.co.uk/DAB. By accessing the page for UK (national and regional) multiplexes, it is seen that the so-called Digital 1 (D1) multiplex includes a number of services, each of which has a unique serviceID. For example, Classic FM has the service ID C2A1, while talkSPORT has the serviceID C0C0. In the embodiment shown in FIG. 1, each stream output by the multicast server 9 is assigned a unique serviceID. For example, the first channel C1 may be assigned the serviceID e1c00097. Other channels are likewise assigned different serviceIDs. Once provisioned to the UE, header files are stored in memory 39. Each header file includes information enabling correlation of the NSC file to the serviceID of the stream with which it is associated, i.e. the content stream from which the NSC file was generated by Media Encoder 5 in the head-end 1. User-selection of a service on the UE 17 causes the TV/Radio Application 43 to identify a stored NSC file that corresponds to the selected ServiceID. Media Player 47 therefore has access to both the WMV stream from the DAB receiver and the NSC file containing the decoding information to enable the WMV to be streamed. In this embodiment, correlation between NSC files and ServiceIDs is achieved by arranging for the NSC file name to include the service ID of its associated stream. So, the header file corresponding to the first channel C1 may be named e1c00097.nsc or at least include the ServiceID in the name: selection of C1 on the EPG causes the TV/Radio Application 43 to locate a stored header file which includes in its filename 'e1c00097'.

Service Provisioning

The UE 17 is arranged so as to be capable of receiving and outputting free-to-air services, typically radio services provided by third party terrestrial broadcasters such as the BBC. In order to receive services for which access is restricted to a sub-group of users, e.g. subscribing users, decryption information needs to be provided to individual UEs. This decryption information is provided in the form of a DRM license from which a key can be extracted to decrypt content that was encrypted at the DRM system in the head-end 1. The following description relates to methods and systems by which such licenses are provided to UEs in response to content requests. As will become clear, a similar mechanism is used to provide the above-mentioned header files to UEs.

Figure 5:
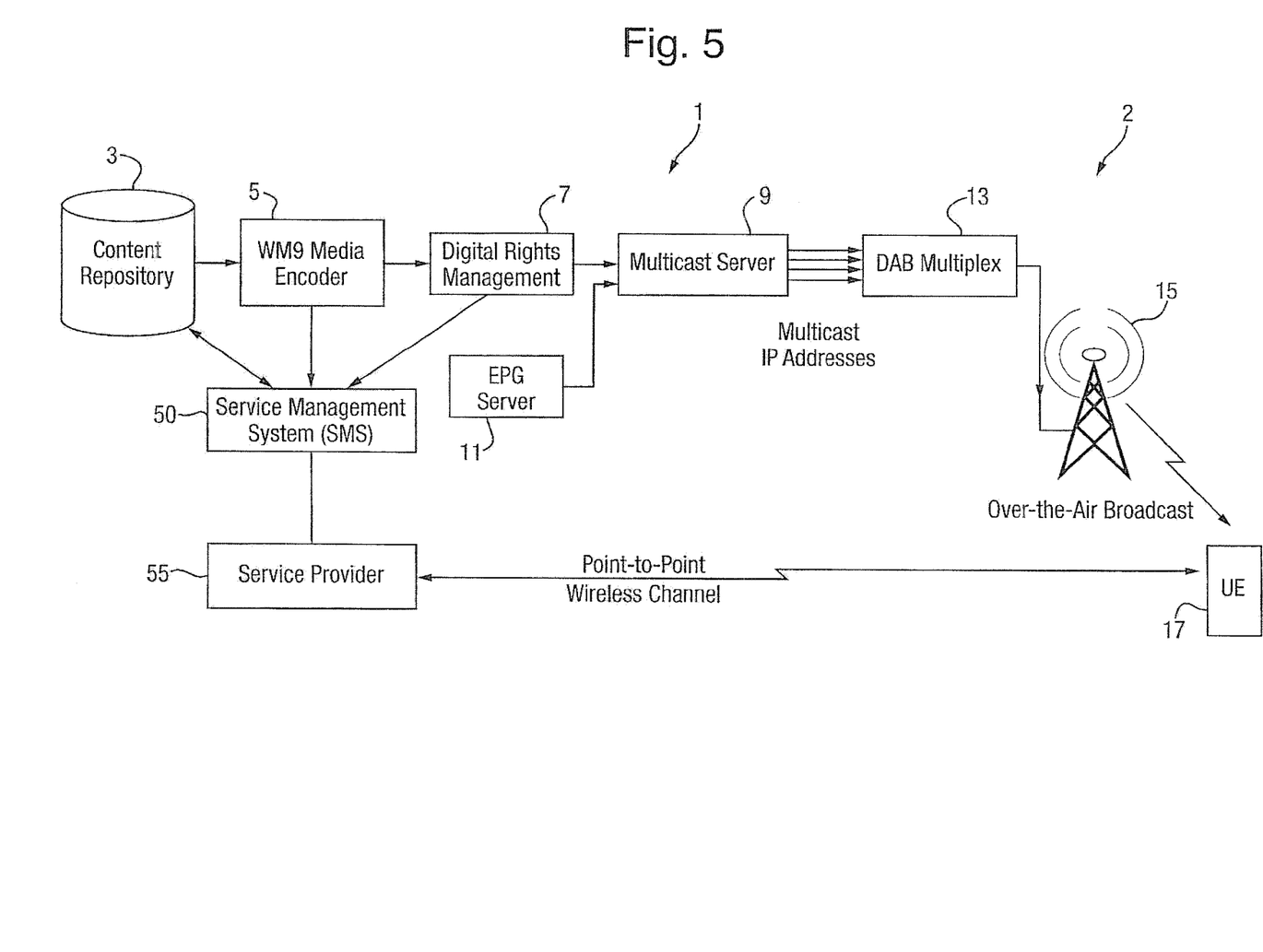
FIG. 5 is a modified version of FIG. 1 in that additional service management system (SMS) and service provider (SP) blocks are shown in relation to the DAB broadcast system.

Referring to FIG. 5, the system of FIG. 1 is shown in further detail to include components relevant to the provisioning process. The head-end 1 and DAB transmitter 2 are arranged as before with n service streams being supplied to the DAB multiplex 13. In addition, the head-end 1 comprises a Service Management System (SMS) 50 which handles management tasks including service provisioning as well as other functions such as the maintenance of user profiles, billing and so on. The head-end 1 is operated by a content provider (CSP) whose role is to provide multimedia content through the content repository 3, the EPG data through the EPG server 11 and the decoding and decrypting information. The CSP does not received orders directly from users but, rather, from one or more Service Providers (SP) 55 with whom the CSP has a commercial relationship. The SP 55 is responsible for offering services according to whichever set of commercial rules they wish to apply. Where the CSP deals with two or more SPs, it follows that the SPs may compete in terms of the service packages they offer and the pricing structure. The CSP is effectively a wholesale provider of multimedia content whereas the SPs represent retail providers. However, this arrangement is by no means essential and the provisioning concept can be applied to arrangements where users communicate directly with the CSP.

Figure 6:
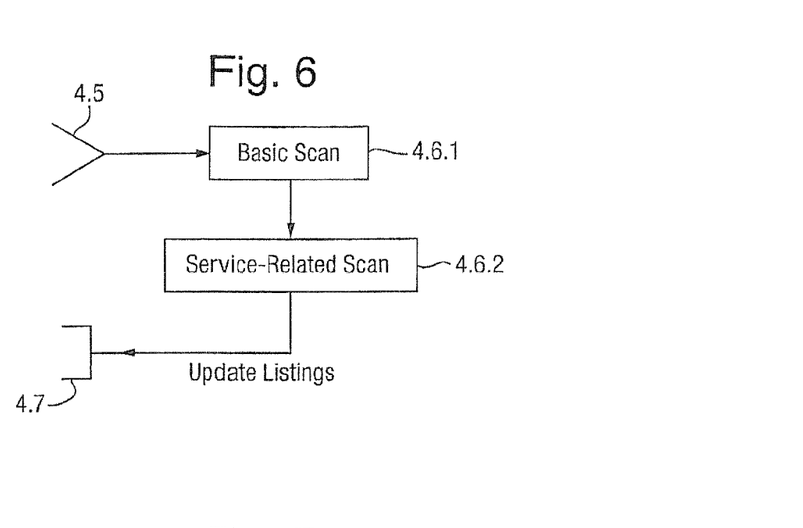
FIG. 6 is a partial flow chart showing sub-steps of a scanning step shown in FIG. 4.

Referring back to FIG. 4, it will be recalled that when the TV/Radio Application 43 is invoked for the first time, said Application is configured automatically to scan for channels in order to populate the EPG of the UE 17 (step 4.6). Following this first use, manual selection of a scan option is required to update channel listings. Referring now to FIG. 6 it will be seen that step 4.6 actually involves a two-stage scan comprising (a) a basic scan 4.6.1 and (b) a service-related scan 4.6.2. The purpose of the basic scan 4.6.1 is to locate free-to-air DAB services that the UE 17 is able to tune to, e.g. BBC terrestrial radio services. The purpose of the service-related scan 4.6.2 is to locate services specific to the SP with which the particular UE 17 is associated. To achieve this, the TV/Radio Application 43 invokes a GPRS call to a web portal associated with the SP 55. The GPRS call includes a scan request which the SP 55 passes on to the SMS 50 of the CSP for provision of a so-called general fulfillment file. The general fulfillment file is a file made available by the CSP to the SP 55 through its SMS 50 and is not user-specific in the sense that the same file is made available to all UEs that make scan requests through the SP's web portal. The general fulfillment file conforms to various ETSI-based standards and uses the binary service information EPG format following [TS102371] with MIME type used in a standards-complaint way to signal URLs. A human-readable equivalent based on an XML format defined in TS102818 is given below, although in relation to a user-specific fulfillment file rather than a general one. A message comprising a URL hyperlink to the general fulfillment file is sent by the WAP Push Protocol (sometimes referred to as the Push Application Protocol or WAP-164) to the UE 17 which automatically accesses the link over a bidirectional GPRS link to download the general fulfillment file from the SP 55. The general fulfillment file is sent back from the SP portal to the UE 17 over the GPRS link.

Since the general fulfillment file follows the binary service EPG format, receipt at the UE 17 results in the EPG being automatically updated to include up-to-date service information on services available to the user from the SP 55. The general fulfillment file is also used to provide certain NSC header files, in this case for services requiring no subscription or payment, e.g. free-to-air services or other 'taster services' corresponding to movie trailers. Rather than transmitting the or each NSC file, the general fulfillment file contains respective hyperlinks to remote URLs which correspond the address of a physical server where the NSC file or files is/are stored. The remote server is likely to be provided by the CSP since the NSC files are generated by the Media Encoder 5 when content is encoded in the head-end 1. The hyperlinks follow the MIME type in order that the UE 17 will automatically call the hyperlinks once the general fulfillment file is received. This sets up a GPRS link to the or each hyperlink URL so that the or each NSC file is downloaded whereafter it is stored in the UE's memory 39. No consideration is made as to payment or subscription at this time since the purpose of this initial scan is to present all channels being made available to the user by the SP 55.

A human-readable example of a general fulfillment file sent to the UE 17 in the service-related scan 4.6.2 is shown below.

```
<serviceInformation version="1">
    <Ensemble id="e1.c181">
        <epg:shortName>D1</epg:shortName>
        <epg:mediumName>DigitalOne</epg:mediumName>
        <frequency type="primary" kHz="222064"/>
        <frequency type="alternative" kHz="223936"/>
        <service format="proprietary">
            <serviceID id="e1c00097.0"/>
            <epg:shortName>Sky News</epg:shortName>
            <epg:mediumName>Sky News</epg:mediumName>
            <link url=http://www........../e1c00097.nsc
mimeValue="application/vnd.ttp.nsc"/>
        </service>
        <service format="proprietary">
        . . . entries for second service on same ensemble
        </service>
    </ensemble>
</serviceinformation>
```

The second line indicates the ensemble or multiplex ID, while the third to sixth lines give the name and frequency information for the ensemble. The remaining lines define each service being made available by the SP and, for those requiring no subscription, a hyperlink may be provided to the service's header file. Here, only one service is defined in full, namely the Sky News service having a service ID of e1c00097.0 and a header file e1c00097.nsc which is accessed via the specified URL.

Upon selection of a service from the EPG, the TV/Radio Application 43 will only output or play the service if it is free-to-air (unencrypted) or, if encrypted by the DRM system 7, if the UE 17 has access to a decryption key for that service. Such decryption keys are contained in a special type of file referred to as a license, the term DRM license being used here since encryption takes place in the DRM system 7. The concept of encryption keys is well known and a detailed discussion is not considered necessary. All that need be understood is that media content, be it an individual programme such as a pay-per-view sports event, a series of programmes, a complete channel and/or a batch of channels can be encrypted at the DRM system 7 using a different key which 'locks' the content in advance of transmission. The locked content can only be decoded and output if it is first unlocked or decrypted at the UE 17 using the corresponding decryption key. The DRM license not only contains a key but also a set of rights or privileges which determine the circumstances in which the key can be used, e.g. specifying that the key is only valid for one month after which it is deleted and a new key obtained.

As with the above-mentioned provision of NSC files, the provision of licenses is also handled by the SMS 50 at the head-end 1.

Figure 7:
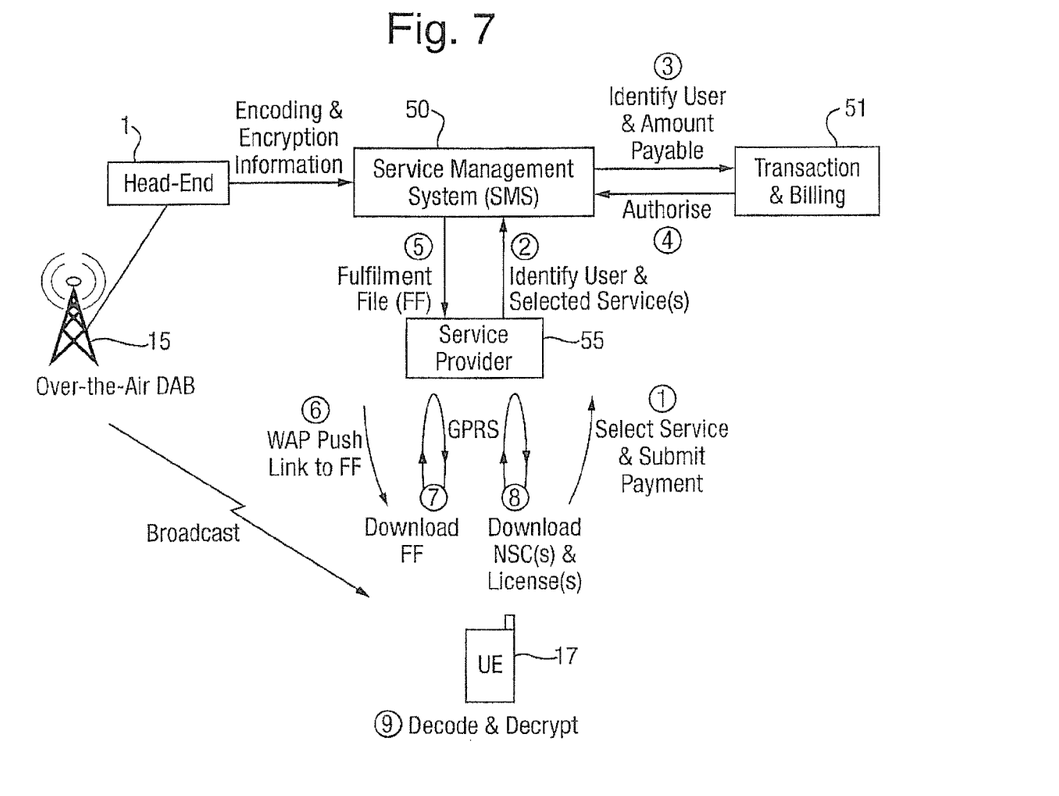
FIG. 7 is a block diagram showing components of FIG. 6 together with an indication of interactions that occur during a content provisioning operation.

Referring to FIG. 7, an overview of the components in a provisioning arrangement are shown, the components being the UE 17, the SP 55 (or rather the SP web portal), the SMS 50, the head-end 1 and a transaction and billing platform 51.

The SP 55, via its web portal, provides a user interface by means of which users may log-in and be presented with details of services to which they are currently entitled and those to which they are not currently entitled. The individual services are, of course, listed in the content repository 3 of the CSP but, in this arrangement at least, it is down to the SP 55 to decide which services, or bundles of services, they wish to provide to their customers based on their commercial arrangement with the CSP. The service options may comprise, for example, a list of pay-per-view events available over the coming month, a list of individual channels, or bundles of channels with appropriate pricing schemes. The options may further specify the time period over which the subscription lasts, e.g. one or more months. In a first step, therefore, the user accesses the SP web portal, most probably using a GPRS connection to the URL of the portal, although selection could be made from a static PC so long as the user can provide their UE identity, e.g. their telephone number. The user selects their service options and provides payment credentials to the SP web portal.

In a second step, the SP 55 constructs a request message identifying the user, the selected service or services and any duration preferences. User identification may be by means of a unique user ID that is referenced at the SMS 50 to identify the handset, or alternatively/additionally, by means of the UE identity, e.g. the telephone number of the UE 17.

In a third step, the transaction and billing platform 51 receives a payment request from the SMS 50 identifying the user and the amount to be billed for the selected services. The transaction and billing platform 51 thereafter handles the payment process and, provided the funds are transferred appropriately, in a fourth step an authorisation message is sent back to the SMS 50.

In response to the authorisation message, the SMS 50 generates a fulfillment file that provides access to the NSC header files and DRM licences required to decode and decrypt the or each service requested by the user in the first step. As with the general fulfillment file, this user-specific fulfillment file comprises hyperlinks to the header files and licences. The SMS 50 receives the NSC header files from the Media Encoder 5 in the head-end 1. Licenses are generated in a secure licence server (not shown in FIG. 7) forming part of the SMS 50 on the basis of encryption keys used to lock the content at the DRM system 7 in the head-end 1. A license will include a key suitable for decrypting individual packages for a specified amount of time. For example, a single key may be associated with a single pay-per-view football match for its 2 hour duration, or with a single channel for a one-month period, or with a batch of channels for a longer duration. The licence rules specify how the key is to be used, e.g. the duration for which the key is valid. The licences so generated will be user or UE-specific in that they can only be accessed by the UE 17 of the requesting user. The or each license hyperlink in the fulfillment file is referred to as a voucher and operates as a one-off token.

In a sixth step, the above-mentioned fulfillment file is forwarded to the SP 55 which sends, via WAP Push, a message containing a URL hyperlink to the fulfillment file's location on the SP's server. As with the general fulfillment file, in a seventh step, the UE recognises the MIME type and automatically calls the hyperlink to set up a GPRS link to the URL so that the fulfillment file is downloaded. Other wireless point-to-point transmission mechanisms can be used to download the fulfillment file, such as WAP Push. The fulfillment file is, of course, user specific in that it comprises hyperlinks indexing URLs from where NSC files and licences can be downloaded to the specified UE 17. Once the fulfillment file is received at the UE 17, the or each NSC file is automatically downloaded from either the SP web portal (or directly from the SMS) by calling the header file hyperlinks. Similarly, the or each DRM license is automatically downloaded by calling the voucher hyperlink, this call resulting in the licence(s) stored in the licence server of the SMS 50 ng downloaded and stored in the secure memory 40 of the UE 17.

As before, the NSC header files and DRM licences are downloaded over a GPRS link from the URLs.

Having obtained NSC header files and licenses, the UE 17 is able to receive and output the requested content at its future broadcast time. This involves matching the ServiceID of the selected content stream with a stored NSC file that contains the same ServiceID in its filename. Identification of the correct DRM license may be performed in a number of ways but here the NSC header file also contains an index number identifying the DRM license in the secure memory 40. At the time of being generated, the DRM license is assigned a random number which is stored in the NSC file for the corresponding content. When Media Player™ matches the NSC file to the selected ServiceID, the presence of the index number identifies that a DRM license is to be retrieved from the secure memory 40 and its index number.

The TV/Radio Application 43 preferably performs a check prior to downloading the fulfillment file and/or NSC files. Although files may be compressed, e.g. using WinZip™, the memory 30 of the UE 17 is nevertheless limited and may not contain sufficient space to hold additional files.

Figure 8:
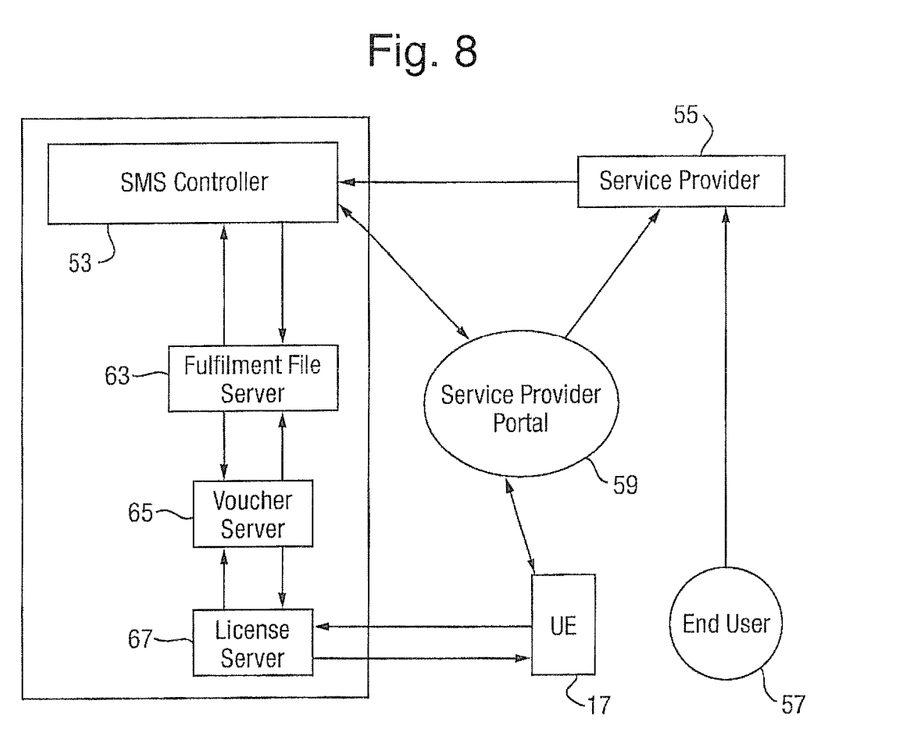
FIG. 8 is a block diagram showing components of the SMS in greater detail and which is further useful for understanding the invention.

Referring now to FIG. 8, the service provisioning system is shown with components of the SMS 50, particularly the fulfillment file, voucher and license servers, 63, 65, 67 shown in greater detail. The SMS 50 includes a controller 53 that is connected, via respective IP channels, to the SP 55, a SP web portal 59 and a fulfillment file server 63. The fulfillment file server 63 is connected to a voucher server 65 which is in turn connected to a license server 67. Operation of each module will now be described in conjunction with FIG. 9 which shows the main operating steps.

Figure 9:
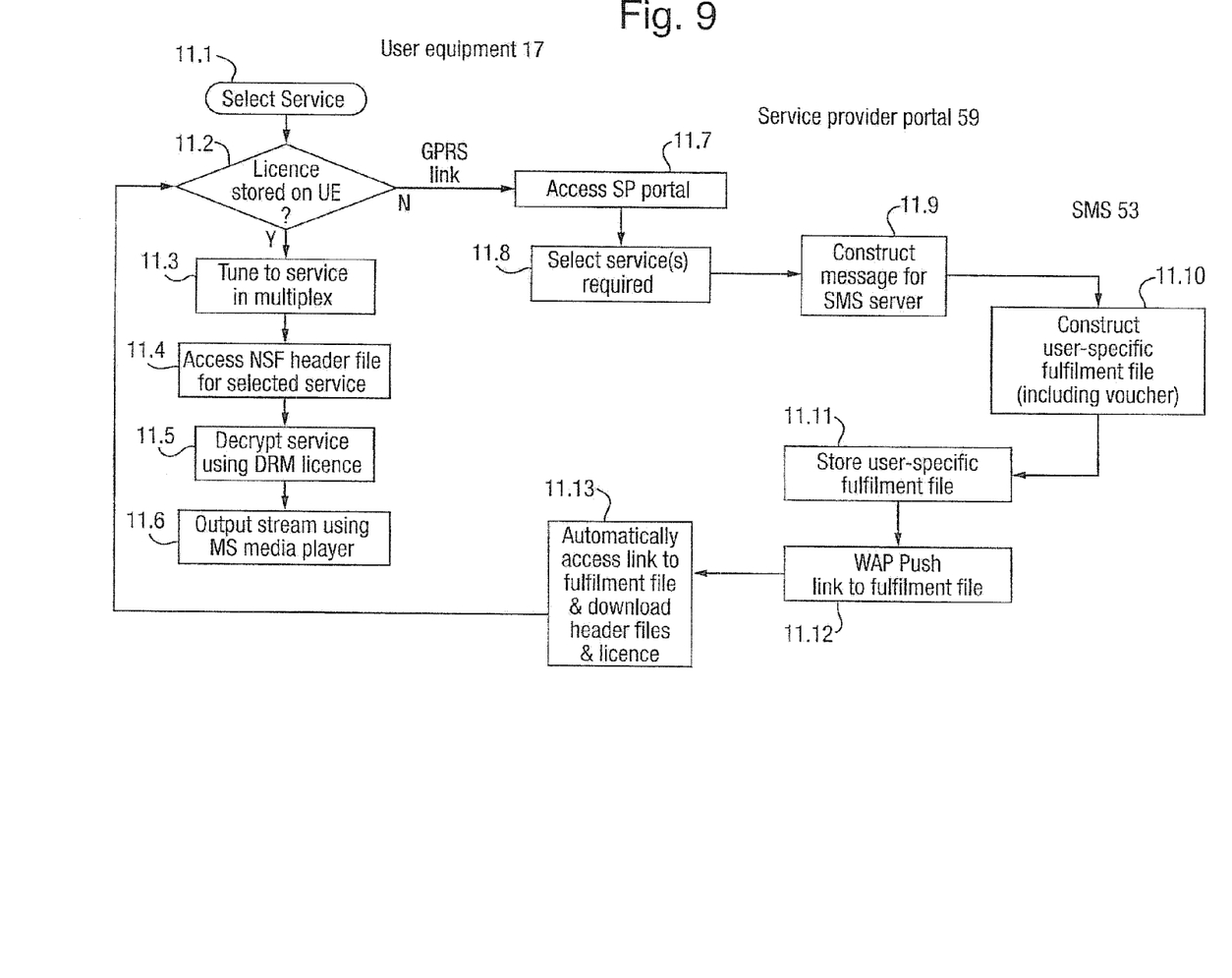
FIG. 9 is a flow chart showing the main steps performed in a service provisioning operation.

The SP 55 is arranged to receive service provisioning requests from end users, here indicated by reference numeral 57. An end user 57 will use their UE 17 to browse services made available by the SP 55. As mentioned previously, these services are presented on an EPG that is populated during the scan step 4.6. In this scan step 4.6, particularly the service scan step 4.6.2, a general fulfillment file is accessed from the SP Portal 59 using a GPRS call. The URL of the SP Portal 59 is stored in the memory 39 of the UE 17. This general fulfillment file does not contain any license information but simply indicates which services are made available by that SP. In response to the service scan 4.6.2 the general fulfillment file is sent to the UE 17 that made the request. Upon selection of a service from the EPG (step 11.1) the TV/Radio Application 43 on the UE 17 checks an internal license directory to determine whether the appropriate DRM license exists (step 11.2). If no such DRM license exists, a message is displayed on the UE display 35 indicating that subscription, or a one-off payment, is required to receive the service. The user 57 may decline and select a different service or proceed with the provisioning process. If the user 57 selects the 'proceed' option, the TV/Radio Application 43 automatically sets up a GPRS connection with the SP portal 59 which presents one or more purchase options to the user, for example to purchase the selected service on a one-off basis (e.g. for a pay-per-view sports event), to subscribe to the selected service for a period of time, or even to subscribe to a bundle of services of which the selected service forms part (step 11.7). Once selected (step 11.8) a request message containing the identity of the user/UE 17 and the selected service or services is sent to the SP server where the details are logged. The SP server 55 constructs an order message containing the user's identity and the service or services required and forwards this to the SMS controller 53 (step 11.9).

Provided the order is authorised, confirmation of receipt is sent back to the SP server 55. The SMS 53 then sends a web service request to the fulfillment file server 63, in response to which the fulfillment file server 63 is arranged create the user-specific fulfillment file, i.e. a fulfillment file specific to the user or UE 17 (step 11.10). The fulfillment file server 63 requests a single-use voucher for each requested service from the voucher server 65. The voucher returned by the voucher server 65 is embedded in the fulfillment file whilst details of the voucher are also sent on to the license server 67. An example of a human readable (XML) fulfillment file which includes such a voucher is given below.

```
<serviceInformation version="1">
    <Ensemble id="e1.c181">
        <epg:shortName>D1</epg:shortName>
        <epg:mediumName>DigitalOne</epg:mediumName>
        <frequency type="primary" kHz="222064"/>
        <frequency type="alternative" kHz="223936"/>
        <service format="proprietary">
            <serviceID id="e1c00097.0"/>
            <epg:shortName>Sky News</epg:shortName>
            <epg:mediumName>Sky News</epg:mediumName>
            <link url=http://www........../e1c00097.nsc
mimeValue="application/vnd.ttp.nsc"/>
        </service>
        <service format="proprietary">
        ... entries for second service on same ensemble
        </service>
        <link
url=http://www..................../voucher/102938418219240391831924056728129"
mimeValue="application/vnd.ttp.msdrm10licence"/>
            <link
url=http://www..................../success/102938418219240391831924056728129"
mimeValue="application/vnd.ttp.licenceconfirm"/>
            <link
url=http://www..................../failure/102938418219240391831924056728129"
mimeValue="application/vnd.ttp.licencefailure"/>
            <link url="000112345678"
Mimevalue="application/vnd.ttp.licenceusid/>
    </ensemble>
</serviceinformation>
```

It will be seen that this user-specific fulfillment file is similar to the general fulfillment file sent in the service-related scan 4.6.2 but now includes a license user ID, a voucher specifying a link from where the required license can be retrieved, as well as links to pages from where success and failure notifications can be retrieved. The user-specific fulfillment file is sent by the SMS controller 53 to the SP portal 59 where it is stored (step 11.11).

A link to the storage location of the fulfillment file is sent to the requesting UE 17 by means of WAP Push (step 11.12). Upon receiving the WAP Push, the TV/Radio Application 43 on the UE 17 is arranged automatically to activate the embedded link and a GPRS session is set up with the SP portal 59 (step 11.13). The fulfillment file is downloaded from the address specified by the link, as are updated NSC header files and the voucher from the embedded links in the fulfillment file. The TV/Radio Application 43 will then initiate a connection to the Licence Server 67 specified in the voucher, and using Microsoft proprietary DRM protocols which form part of said application, send across the voucher that has been signed by a digital certificate. The licence server 67 is arranged to process the voucher, and on the basis of the key used to encrypt the relevant content at the head-end, to deliver a licence to the UE 17 which contains the corresponding decryption key. Depending on whether or not the final licence is successfully received, the TV/Radio Application 43 will call the appropriate URL specified in the fulfillment file to indicate that the licence has/has not been loaded.

Assuming the requested licence is successfully delivered to the UE 17, Media Player will be able to decode and decrypt the WMF content streams subsequently received from the over-the-air broadcast (steps 11.2 to 11.6).

The above description relates to methods and systems for delivering decoding and/or decryption information to or at a wireless receiver, particularly a handheld mobile telephone that includes a DAB receiver. The receiver is therefore capable of receiving digital media content, such a radio or television streams or files, from the DAB channel and successfully outputting the content data to a display or through a loudspeaker so long as the required decoding and decryption rights are stored on the receiver. Such decoding/decryption information is provided in advance and via a point-to-point channel which is independent of the broadcast channel.

Although the detailed description relates to a DAB broadcasting environment, the service provisioning method and system may be applied to any over-the-air broadcasting environment where decoding and/or decryption information is required to decode and/or decrypt digital media content, such as digital video or audio.

The invention claimed is:

1. A method of receiving decoding information at a wireless receiver to enable the decoding of encoded media content received from an over-the-air broadcast channel, the method comprising:
   (a) at a time td, receiving a programme information file (PIF) comprising one or more links to a respective decoding file stored at a remote location, the or each decoding file being associated with media content to be transmitted in an over-the-air broadcast channel at a subsequent broadcast time tb and comprising information for software provided at the wireless receiver to decode the encoded media content;
   (b) automatically activating, over a bi-directional data link, said one or more link at the wireless receiver thereby to cause transmission of the associated decoding file from said remote location; and
   (c) storing said one or more received decoding file in memory on the wireless receiver.

2. The method according to claim 1, wherein
   (a) comprises receiving said the or each decoding file from the remote location over a data link that is independent of the over-the-air broadcast channel.

3. The method according to claim 1, wherein
the received PIF comprises a hyperlink to the remote location, activation of said hyperlink being arranged to establish an internet protocol (IP) session between the wireless receiver and the remote location thereby to enable transmission of the decoding file.

4. The method according to claim 1, wherein
a check is performed between (a) and (b) to determine if there is sufficient memory available on the wireless receiver to store the decoding file, (b) being performed only if sufficient memory is available.

5. The method according to claim 1, wherein
the PIF is received over a wireless data link.

6. The method according to claim 5, wherein
the PIF is received at the wireless receiver from a cellular communications network.

7. The method according to claim 1, further comprising, prior to (a), sending a PIF request from the wireless receiver to a remote location, the PIF request being sent over a wireless data link and identifying the wireless receiver such that the PIF sent back in (a) is particular to said wireless receiver.

8. The method according to claim 1, wherein
the decoding file is a programme header file comprising information at least identifying the encoding format of the encoded media content thereby to enable decoding and output by the software at the wireless receiver.

9. The method according to claim 1, wherein
the decoding file is a license file from which can be derived a key suitable for decoding the associated media content thereby to enable decoding and output by the software of the wireless receiver.

10. A method of receiving decryption information at a wireless receiver to enable the decoding of encrypted media content received from an over-the-air broadcast channel, the method comprising:
(a) at a time td, receiving a programme information file (PIF) comprising
one or more links to a respective decryption file stored at a remote location, the or each decryption file being associated with media content to be transmitted in an over-the-air broadcast channel at a subsequent broadcast time tb and comprising information for software provided at the wireless receiver to decrypt the encrypted media content;
(b) automatically activating, over a bi-directional data link, said one or more links at the wireless receiver thereby to cause transmission of the associated decryption file from said remote location; and
(c) storing said one or more received decryption files in memory on the wireless receiver.

11. A non-transitory computer-readable storage medium storing a computer program, the computer program comprising computer-readable instructions for performing the method according to claim 1.

12. A wireless receiver comprising a processor arranged to operate under the control of the computer program stored in the computer-readable storage medium as claimed in claim 11.

13. A method for delivering decoding information to a wireless receiver to enable the decoding of encoded media content transmitted in an over-the-air broadcast signal, the method comprising:
(a) transmitting a programme information file (PIF) comprising one or more links to a respective decoding file to the wireless receiver, the or each decoding file being associated with media content to be transmitted in an over-the-air broadcast channel at a subsequent broadcast time tb and comprising information for software provided at the wireless receiver to decode the encoded media content;
(b) in response to activation of one or more links in the PIF, sending the associated decoding file to the wireless receiver at a time td which is prior to said broadcast time tb.

14. The method according to claim 13, wherein
(a) comprises sending the PIF to the wireless receiver over a wireless data link.

15. The method according to claim 14, wherein
the PIF is sent to the wireless receiver using a cellular communications network.

16. The method according to claim 15, wherein
the PIF is sent to the wireless receiver using WAP Push.

17. The method according to claim 13, wherein
(a) is performed in response to receiving a PIF request from the wireless receiver, the PIF request being sent over a wireless data link and identifying the wireless receiver such that the PIF sent back in (a) is particular to said wireless receiver.

18. The method according to claim 13, wherein
the decoding file is a programme header file comprising information at least identifying the encoding format of the encoded media content thereby to enable decoding and output by software of the wireless receiver.

19. The method according to claim 13, wherein
the decoding file is a license file from which can be derived a key suitable for decoding the associated media content thereby to enable decoding and output by the software of the wireless receiver.

20. A non-transitory computer-readable storage medium storing a computer program, the program comprising computer-readable instructions for performing the steps of a method according to claim 13.

21. An apparatus comprising a processor arranged to operate under the control of the computer program stored in the computer-readable storage medium as claimed in claim 20.

22. A method for delivering one or more decryption keys to a wireless receiver thereby to enable decryption, at said wireless receiver, of encrypted media content transmitted in an over-the-air broadcast signal, the method comprising:
(a) transmitting a programme information file (PIF) comprising one or more links to a respective decryption file to the wireless receiver, the or each decryption file being associated with encrypted media content to be transmitted in an over-the-air broadcast channel at a subsequent broadcast time tb and comprising information for software provided at the wireless receiver to decrypt the encrypted media content;
(b) in response to activation of one or more links in the PIF, sending the associated decryption file to the wireless receiver at a time td which is prior to said broadcast time tb.

23. A non-transitory computer-readable storage medium storing a computer program, the computer program comprising computer-readable instructions for performing the method according to claim 22.

24. An apparatus comprising a processor arranged to operate under the control of the computer program stored in the computer-readable storage medium as claimed in claim 23.

25. A method for receiving and decoding media content at a wireless receiver, the method being performed at the wireless receiver and comprising:
(a) receiving a first message comprising a hyperlink to a first location, downloading a programme information file therefrom which includes a hyperlink to a second location, and automatically activating said hyperlink over a bi-directional data link to download and storing one or more decoding files from the second location using a non-broadcast data channel;
(b) selecting a media content stream receivable from a unidirectional broadcast channel;
(c) identifying a stored decoding file suitable for decoding the selected media content stream in (b); and
(d) receiving and decoding the selected media content stream using the decoding file identified in (c).

26. An apparatus for receiving and outputting digital content receivable from an over-the-air broadcast signal, the apparatus comprising:
a broadcast receiver for receiving digital media content from an over-the-air broadcast channel;
a wireless transceiver for establishing a data channel with a remote server;
a control system; and
a decoder, wherein
the wireless transceiver is arranged to receive a programme information file (PIF) comprising a link to a remote server storing one or more decoding files, automatically to activate the link to establish a data channel with said server, to receive one or more decoding files from said server, and to store the or each decoding file in a storage, wherein the control system is arranged, in response to receiving identification of selected media content, to identify a decoding file in said storage that is associated with said selected media content, and wherein the decoder is arranged to receive said selected encoded media content from the broadcast channel and to decode the media content using the identified decoding file.

* * * * *